US008395739B2

(12) United States Patent
Hwang et al.

(10) Patent No.: US 8,395,739 B2
(45) Date of Patent: Mar. 12, 2013

(54) IN-PLANE-SWITCHING MODE LIQUID CRYSTAL DISPLAY DEVICE WITH LIQUID CRYSTAL LAYER AND PASSIVATION FILM HAVING TWO ORDERS OF A SPECIFIC RESISTIVITY LOWER THAN A SPECIFIC RESISTIVITY OF FIRST ALIGNMENT FILM

(75) Inventors: Han Shin Hwang, Goyang-si (KR); Joung Won Woo, Goyang-si (KR); Dong Guk Kim, Goyang-si (KR); Woo Keun Lee, Gimpo-si (KR); Han Jin Ahn, Seoul (KR)

(73) Assignee: LG Display Co., Ltd., Seoul (KR)

( * ) Notice: Subject to any disclaimer, the term of this patent is extended or adjusted under 35 U.S.C. 154(b) by 453 days.

(21) Appl. No.: 12/639,951

(22) Filed: Dec. 16, 2009

(65) Prior Publication Data

US 2010/0165277 A1    Jul. 1, 2010

(30) Foreign Application Priority Data

Dec. 30, 2008 (KR) ........................ 10-2008-0136536

(51) Int. Cl.
*G02F 1/1343* (2006.01)
*G09G 3/36* (2006.01)
*H01L 29/04* (2006.01)

(52) U.S. Cl. .............. 349/141; 349/42; 349/43; 345/92; 257/72; 257/59

(58) Field of Classification Search .............. 349/42–43, 349/141; 345/92; 257/59, 72
See application file for complete search history.

(56) References Cited

U.S. PATENT DOCUMENTS

| 5,243,202 | A  | * | 9/1993  | Mori et al. ........................ 257/59 |
| 6,235,561 | B1 | * | 5/2001  | Seiki et al. ...................... 438/151 |
| 6,838,017 | B1 | * | 1/2005  | Chai et al. ................ 252/299.01 |
| 6,894,744 | B2 | * | 5/2005  | Kim .............................. 349/110 |
| 6,900,853 | B2 | * | 5/2005  | Watanabe et al. ............... 349/43 |
| 7,255,811 | B2 | * | 8/2007  | Hirschmann et al. .... 252/299.01 |
| 2001/0046004 | A1 | * | 11/2001 | Ohe et al. ........................ 349/43 |

FOREIGN PATENT DOCUMENTS

| CN | 1106544 A | 8/1995 |
| EP | 0 644 452 A2 | 3/1995 |

* cited by examiner

*Primary Examiner* — Hoan C Nguyen
(74) *Attorney, Agent, or Firm* — Birch, Stewart, Kolasch & Birch, LLP

(57) ABSTRACT

An in-plane-switching mode liquid crystal display device is disclosed. The LCD device includes: first and second substrates opposite to each other; a liquid crystal layer interposed between the first and second substrates; a passivation film formed on the first substrate in which a thin film transistor is disposed; pixel and common electrodes arranged alternately with each other; and a first alignment film formed on the pixel and common electrodes. The liquid crystal layer and the passivation film are formed to have lower non-resistances than that of the first alignment film.

5 Claims, 4 Drawing Sheets

IN-PLANE-SWITCHING MODE LIQUID CRYSTAL DISPLAY DEVICE WITH LIQUID CRYSTAL LAYER AND PASSIVATION FILM HAVING TWO ORDERS OF A SPECIFIC RESISTIVITY LOWER THAN A SPECIFIC RESISTIVITY OF FIRST ALIGNMENT FILM

CROSS-REFERENCE TO RELATED APPLICATION

This application claims priority under 35 U.S.C. 119 to Korean Patent Application No. 10-2008-00136536, filed on Dec. 30, 2008, which is hereby incorporated by reference in its entirety.

BACKGROUND

1. Field of the Disclosure

This disclosure relates to a liquid crystal display device, and more particularly to the liquid crystal display device of an in-plane-switching mode adapted to prevent a residual image problem.

2. Description of the Related Art

Nowadays, liquid crystal display (LCD) devices have been highlighted as the next generation of display devices. This results from the fact that the LCD devices have features of low power consumption, superior portability, intensive technology, highly added value, and others. The LCD devices are configured to use light transmittance varying along the molecular alignment of a liquid crystal, in order to provide images to users.

Among the LCD devices, a twisted nematic (TN) mode LCD device has been mainly used because of its simple configuration and easy formation. The TN mode LCD device forces liquid crystal molecules to be aligned from a horizontal direction into a perpendicular direction against a substrate when a voltage is applied to it. The liquid crystal molecule allows light transmittance to vary along a viewing angle (or a viewing direction) due to its reflective index anisotropy. As such, the TN mode LCD device driving the liquid crystal molecules has a narrowed viewing angle.

In order to enhance the viewing angle, an in-plane-switching (IPS) mode LCD device has been proposed. The IPS mode LCD device includes first and second substrates opposite each other and a liquid crystal layer interposed between the first and second substrates. The first substrate includes a thin film transistor, a pixel electrode with a plurality of branched sub-pixel electrodes, a common electrode with a plurality of branched sub-common electrodes, which are formed in each pixel region on it. The sub-pixel electrodes and the sub-common electrodes are arranged alternately with each other and used to form a horizontal electric field. The second substrate is configured to include a black matrix, color filter patterns, an overcoat layer, and an alignment film on it. Such an IPS mode LCD device forces the liquid crystal molecules to align parallel to the horizontal electric field. Accordingly, the viewing angle can be enhanced.

The alignment film formed from an organic material on at least one of the first and second substrates can discharge ionized and polarized impurities under high temperature. The impurities can be absorbed and adhered between the alignment film and a lower film. As such, a parasitic capacitance can be generated in the interfacial surface of the alignment film and the lower layer. The parasitic capacitance varies an effective voltage applied to the liquid crystal layer, thereby causing the appearance of a residual image.

More specifically, if an image is displayed for an extended period of time, the parasitic capacitor charges a direct current (DC) voltage applied for the image display. The charged DC voltage causes molecules within the liquid crystal layer to realign even when an additional DC voltage is not applied to the liquid crystal layer. Accordingly, although a new DC voltage for changing the image is applied to the liquid crystal layer, a trace of the image formed by the charged DC voltage remains. In other words, a residual image appears due to the DC voltage charged in the parasitic capacitor.

BRIEF SUMMARY

Accordingly, the present embodiments are directed to an IPS mode LCD device manufacturing method that substantially obviates one or more of problems due to the limitations and disadvantages of the related art.

An object of the present embodiment is to provide an IPS mode LCD device manufacturing method that is adapted to prevent the residual image problem caused by a remaining DC voltage.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an IPS mode LCD device manufacturing method includes: first and second substrates opposite to each other; a liquid crystal layer interposed between the first and second substrates; a passivation film formed on the first substrate in which a thin film transistor is disposed; pixel and common electrodes arranged alternately with each other; and a first alignment film formed on the pixel and common electrodes. The liquid crystal layer and the passivation film are formed to have lower non-resistances than that of the first alignment film.

The liquid crystal layer is formed to have a non-resistance of about $5.5 \times 10^{12}$ Ωcm. Also, the liquid crystal layer with a non-resistance of about $5.5 \times 10^{12}$ Ωcm is formed to further include one of a carbon-nitride-based liquid crystal material and a tolane-based liquid crystal material.

The passivation film is formed to have a non-resistance of about $7.6 \times 10^{12}$ Ωcm. Also, the passivation film with a non-resistance of about $7.6 \times 10^{12}$ Ωcm is formed through a chemical vapor deposition process which controls a SiH4/NH3 flow rate.

The second substrate includes a black matrix formed on the second substrate, color filter patterns formed on the second substrate exposed by the black matrix, and a second alignment film formed on the second substrate which is provided with the color filter patterns.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
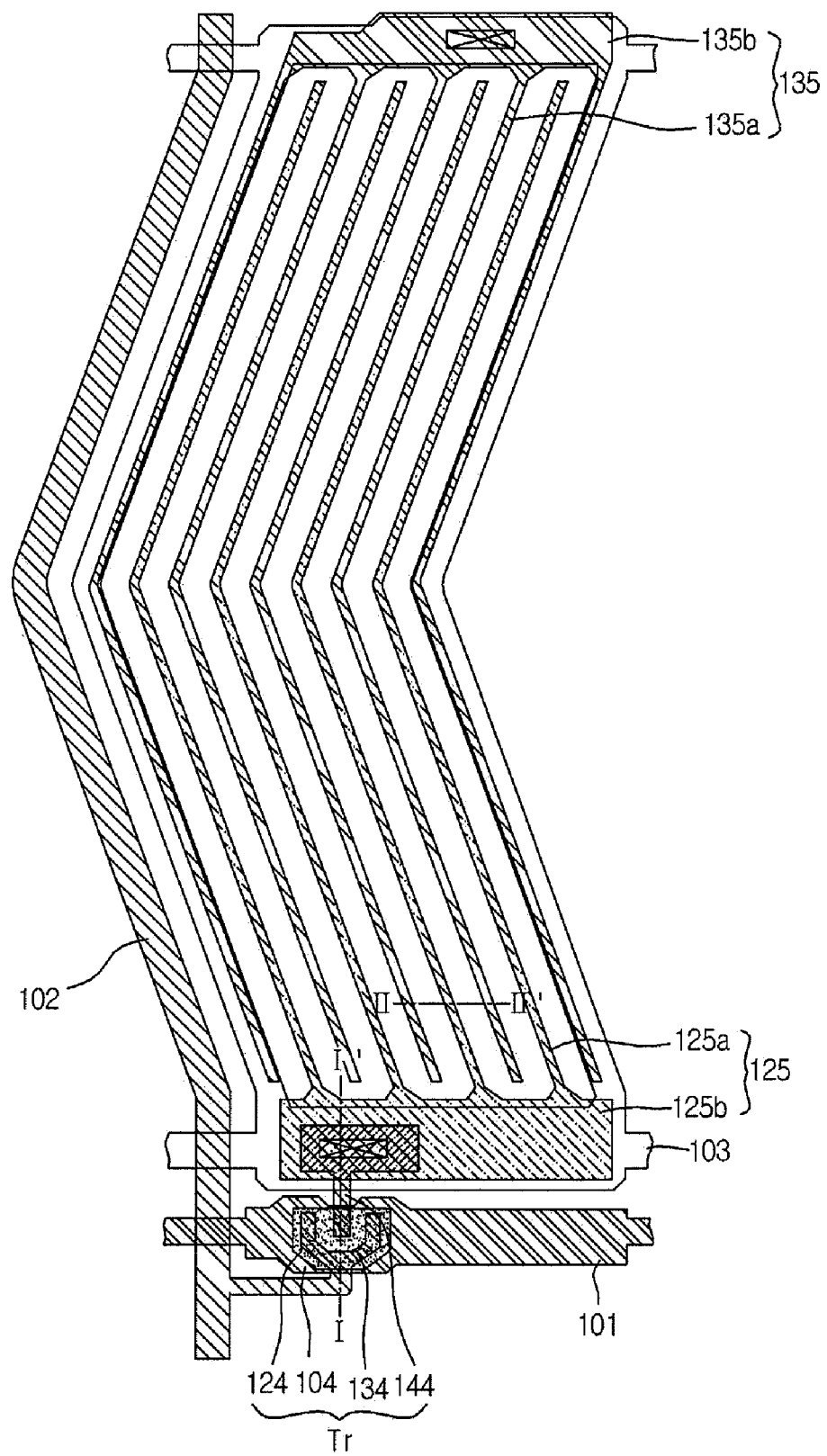
FIG. 1 is a planar view showing an IPS mode LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

An IPS mode LCD device according to an embodiment of the present disclosure will now be explained in detail with reference to the attached drawings.

Figure 2:
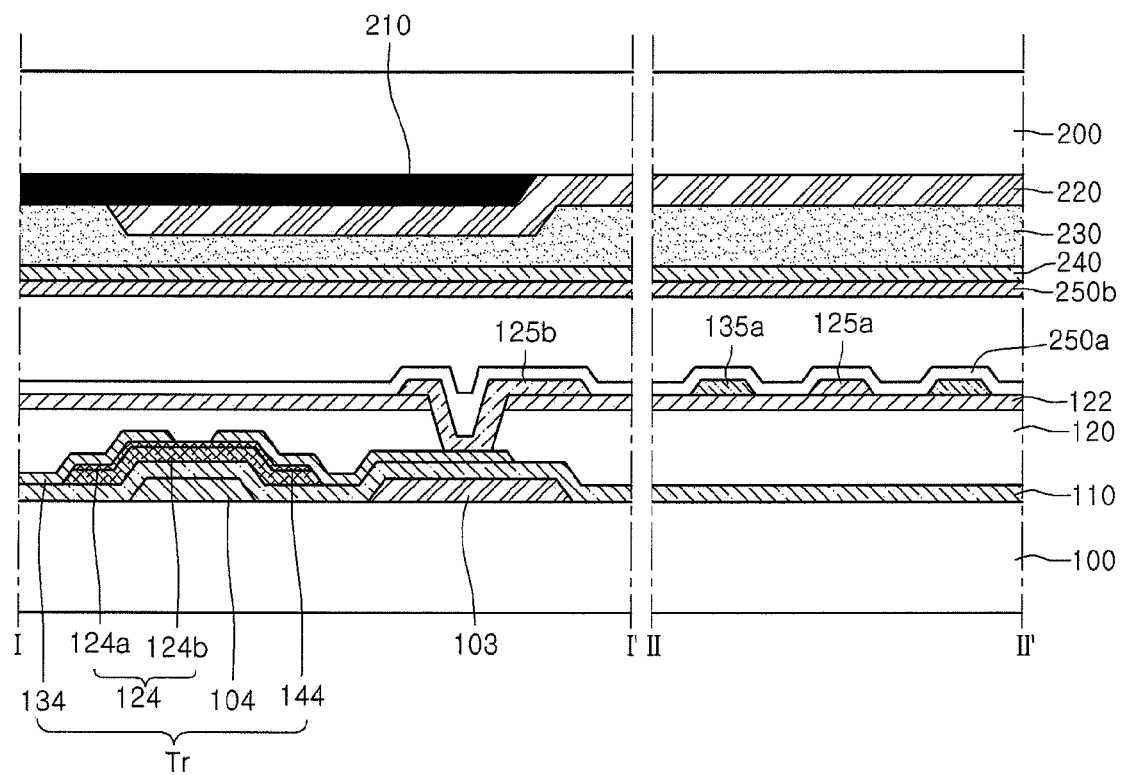
FIG. 2 is a cross-sectional view showing an IPS mode LCD device taken along lines I-I' and II-II' in FIG. 1.

FIGS. 1 and 2 are views used to explain an IPS mode LCD device according to an embodiment of the present disclosure. In detail, FIG. 1 is a planar view showing an IPS mode LCD device according to an embodiment of the present disclosure, and FIG. 2 is a cross-sectional view showing an IPS mode LCD device taken along lines I-I' and II-II' in FIG. 1. The IPS mode LCD device is configured to include a plurality of pixels for displaying images, but only a single pixel is largely shown in FIGS. 1 and 2 for the convenience of explanation.

Referring to FIGS. 1 and 2, the IPS mode LCD device includes a thin film transistor Tr, a pixel electrode 125, and a common electrode 135 which are arranged on a first substrate 100, as well as a black matrix 210, a color filter pattern 220, and an overcoat layer 230 which are sequentially disposed on a second substrate. The IPS mode LCD device further includes at least one alignment film 250 and a liquid crystal layer 300 which is interposed between the first and second substrates 100 and 200.

More specifically, the first substrate 100 can be defined into pixel regions by gate lines 101 and data lines 102 crossing to each other on it. The gate line 101 and the data line 102 are insulated from each other by a gate insulation film 110 therebetween. The gate lines 101 are arranged separately from common lines 103 at fixed intervals. The common lines 103 are formed from the same conductive material as the gate lines 101.

The thin film transistor Tr is disposed on each of the pixel regions. Also, the thin film transistor Tr includes a gate electrode 104, a semiconductor pattern 124, the gate insulation film 110, a source electrode 134, and a drain 144. The gate electrode 104 is electrically connected to the gate line 101. The source electrode 134 is electrically connected to the data line 102. As such, the thin film transistor Tr is electrically connected to the gate line 101 and the data line 102. The semiconductor pattern 124 can include an active pattern 124$a$ and an ohmic contact pattern 124$b$ which is interposed between the active pattern 124$a$, the source electrode 134, and the drain electrode 144.

A passivation film (or a protective film) 120 is disposed on the first substrate 100 provided with the thin film transistor Tr. The passivation film 120 is formed from an inorganic material such as a silicon nitride ($SiN_x$).

The pixel electrode 125 and the common electrode 135 are disposed on each of the pixel regions and used to form an electric field for driving the liquid crystal layer 300. The pixel electrode 125 can be formed from a conductive material able to allow light through it. For example, the pixel electrode 125 can be formed from any one of indium-tin-oxide (ITO) and indium-zinc-oxide (IZO) capable of passing light through. Alternatively, the pixel electrode 125 can be formed in a single body united with the drain electrode 144, unlike that shown in the drawings.

The pixel electrode 125 can include first pixel electrodes 125$a$ and a second pixel electrode 125$b$. The first pixel electrodes 125$a$ are separated from one another at fixed intervals. Each of the first pixel electrodes 125$a$ is formed into a bar shape. Alternatively, the first pixel electrodes 125$a$ are formed into a bent bar shape, in order to define the pixel region into domains. In this case, the pixel region can form electric fields of different directions in the domains, thereby allowing a larger viewing angle. However, the first pixel electrodes 125$a$ of the present embodiment are not limited to the bent bar shape used to divide the pixel region into the domains. These first pixel electrodes 125$a$ are electrically connected to one another by the second pixel electrode 125$b$. The second pixel electrode 125$b$ can be formed into a single body united with the first pixel electrodes 125$a$. A part of the second pixel electrode 125$b$ is electrically connected to the drain electrode 144 of the thin film transistor Tr. Moreover, the second pixel electrode 125$b$ can be formed to overlap with the common line 103 in the center of insulation films, such as the gate insulation film 110 and the passivation film 120, so as to configure a storage capacitor.

The common electrode 135 can also be formed from a transparent conductive material. The common electrode 135 is configured to include first common electrodes 135$a$ and a second common electrode 135$b$. The first common electrodes 135$a$ are separated from one another at fixed intervals and arranged to alternately with the first pixel electrodes 125$a$. As such, the first common electrodes 135$a$ can also be formed in the same bent bar shape as the first pixel electrodes. These first common electrodes 135$a$ are electrically connected to one another by the second common electrode 135$b$. The second common electrode 135$b$ is electrically connected to the common line 103.

If an electric signal is applied to the pixel electrode 125 and a common voltage is applied to the common electrode 135, horizontal electric fields are formed between the first pixel electrodes 125$a$ and the first common electrodes.

Furthermore, a first alignment film 250$a$ can be disposed on the substrate 100 partially covered with the pixel and common electrodes 125 and 135. The first alignment film 250$a$ is used in an initially molecular alignment of the liquid crystal layer 300.

The black matrix 210 disposed on the second substrate 200 prevents the leakage of light. The black matrix 210 is formed to include a plurality of openings which each expose the pixel regions used to display images. The color filter pattern 220 is disposed onto each of the openings, i.e., the pixel regions. The overcoat layer 230 can further be disposed on the second substrate 200 covered with the black matrix 210 and the color filter patterns 220. The overcoat layer 230 has a planarization surface and eliminates step-coverage caused by the black matrix 210 and the color filter pattern 220.

The second substrate 200 can further include a second alignment film 250b disposed on the overcoat layer 230. The second alignment film 250b is used in an initially molecular alignment of the liquid crystal layer 300.

The first alignment film 250a formed from an organic material can discharge ionized and polarized impurities. The impurities can be distributively drifted toward the liquid crystal layer 300 and the passivation film 120 which are disposed on and under the first alignment film 250a. A parasitic capacitance is generated in an interfacial surface of the first alignment film 250a and the liquid crystal layer 300 and/or another interfacial surface of the first alignment film 250a and the passivation film 120 by the drifted impurities. The parasitic capacitance varies an effective DC voltage applied to the liquid crystal layer 300, thereby causing a residual image on the LCD device.

To address this matter, the IPS mode LCD device includes the liquid crystal layer 300 and the passivation film 120 which have lower non-resistances than that of the first alignment film 250a. The liquid crystal layer 300 and/or the passivation film 120 can discharge the DC voltage charged in the interfacial surface between themselves and the first alignment film 250a. As such, the generation of residual images on the LCD device can be prevented.

In view of this point, the liquid crystal layer 300 must have a lower non-resistance value compared to the first alignment film 250a. In order to substantially discharge the charged DC voltage, the non-resistance value of the liquid crystal layer 300 may preferably become lower by at least two orders of that of the first alignment film 250a. Normally, the first alignment film 250a has a non-resistance value of about $8.3 \times 10^{14}$ Ωcm. However, if the non-resistance of the liquid crystal layer 300 is above $8.3 \times 10^{14}$ Ωcm, the DC voltage charged in the interfacial surface between the liquid crystal layer 300 and the first alignment film 250a can not be discharged, and a parasitic capacitor can be formed in the interfacial surface between the liquid crystal layer 300 and the first alignment film 250a, as well. Therefore, the present embodiment enables the liquid crystal layer 300 to have a lower non-resistance than $8.3 \times 10^{14}$ Ωcm, so that the DC voltage charged in the interfacial surface of the liquid crystal layer 300 and the first alignment film 250a can be easily discharged through the liquid crystal layer 300. Preferably, the liquid crystal layer 300 is configured to have two orders of non-resistance lower than that of the first alignment film 250a. As an example, the liquid crystal layer 300 can have a non-resistance value of about $5.5 \times 10^{12}$ Ωcm.

To this end, the liquid crystal layer 300 can be formed to further include any one of a carbon-nitride-based liquid crystal material represented by the following chemical formula 1 and a tolane-based liquid crystal material represented by the following chemical formula 2.

[Chemical Formula 1]

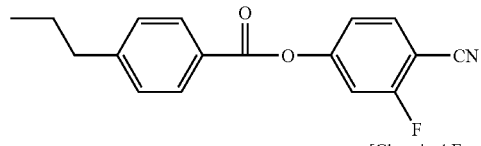

[Chemical Formula 2]

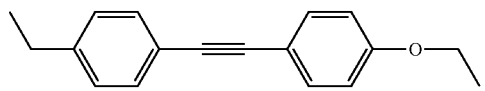

The additional liquid crystal material allows only the non-resistance of the liquid crystal layer 300 to be lowered. In other words, the liquid crystal layer 300 with the additional liquid crystal material maintains the same dielectric and reflective indexes as the previous liquid crystal layer without the additional liquid crystal material.

Similarly, the passivation film 120 must have a lower non-resistance value compared to the first alignment film 250a. In order to substantially discharge the charged DC voltage, the non-resistance value of the passivation film 120 should become at least two orders lower than that of the first alignment film 250a. Normally, the first alignment film 250a has a non-resistance value of about $8.3 \times 10^{14}$ Ωcm. However, if the non-resistance of the passivation film 120 is above $8.3 \times 10^{14}$ Ωcm, the DC voltage charged in the interfacial surface between the passivation film 120 and the first alignment film 250a can not be discharged, and a parasitic capacitor can be formed in the interfacial surface between the passivation film 120 and the first alignment film 250a, as well. As such, the present embodiment forces the passivation film 120 to have a lower non-resistance than $8.3 \times 10^{14}$ Ωcm, so that the DC voltage charged in the interfacial surface of the passivation film 120 and the first alignment film 250a can be easily discharged through the passivation film 120. Preferably, the passivation film 120 should be configured to have two orders of non-resistance lower than that of the first alignment film 250a. As an example, the passivation film 120 can have a non-resistance value of about $7.6 \times 10^{12}$ Ωcm.

To this end, the passivation film 120 can be formed from a silicon nitride material through a chemical vapor deposition process which can control a $SiH_4/NH_3$ flow ratio. In this case, the amount of silicon contained in the passivation film 120 increases along the $SiH_4/NH_3$ flow rate. Moreover, the non-resistance of the passivation film 120 can be adjusted by the $SiH_4/NH_3$ flow rate as the following Table 1.

TABLE 1

| | Items | | | | | |
|---|---|---|---|---|---|---|
| | 1 | 2 | 3 | 4 | 5 | 6 |
| $SiH_4/NH_3$ ratio | 0.125 | 0.325 | 1 | 3 | 4 | 4.5 |
| $N_2$ (sccm) | 3200 | 3200 | 3200 | 3200 | 3200 | 3200 |
| Non-resistance (Ωcm) | 5.8E+14 | 5.1E+14 | 4.3E+14 | 2.1E+13 | 9.8E+12 | 7.2E+12 |

As seen from Table 1, it is evident that the non-resistance of the passivation film 120 becomes lower as the amount of silicon contained in the passivation film 120 increases. Therefore, the non-resistance of the passivation film 120 can be lowered in a range of E+14 Ωcm to E+12 Ωcm by increasing the amount of silicon contained in the passivation film 120.

In this manner, the passivation film 120 and the liquid crystal layer 300 are formed to have lower non-resistances than that of the first alignment film 250a, so that energy bands of the passivation film 120 and the liquid crystal layer 300 become lower compared to an energy band of the first alignment film 250a. As such, the passivation film 120 and the liquid crystal layer 300 can be used in paths of discharging the DC voltages charged in the interfacial surfaces between themselves and the first alignment film 250a. Accordingly, the residual image problem on the IPS mode LCD device can be prevented.

Actually, a lowest-unoccupied-molecular-orbital (LUMO) energy level (or conduction level) of the first alignment film 120 corresponds to about 5.42 eV. Also, LUMO energy levels of the passivation film (PAS-L) 120 and the liquid crystal layer (LC-L) 300 according to the present embodiment become about 4.67 eV and 4.0 eV, respectively. On the other hand, LUMO energy levels of the related art passivation film (PAS-H) and the liquid crystal layer (LC-H) according to the related art are about 5.49 eV and 4.5 eV, respectively.

FIGS. 3A to 3D graphically show the LUMO energy band structures of LCD devices in which any one of the present embodiment passivation film PAS-L and the related art passivation film PAS-H and any one of the present liquid crystal layer LC-L and the related art liquid crystal layer LC-H are formed opposite to each other in the center of the first alignment film PI.

Figure 3A:
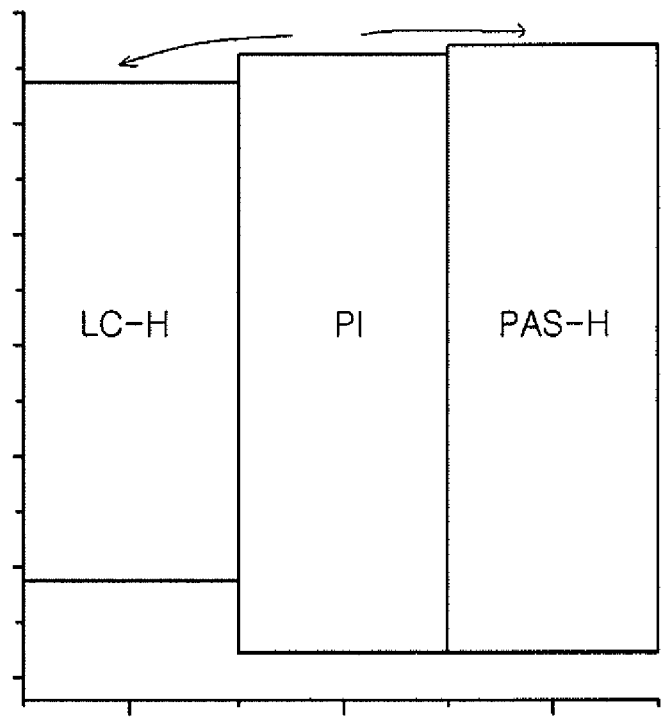
FIGS. 3A to 3D are graphical data sheets comparing energy bands of first alignment film, a passivation film, and a liquid crystal layer which are included in IPS mode LCD devices according to the related art and an embodiment of the present disclosure.
Figure 3B:
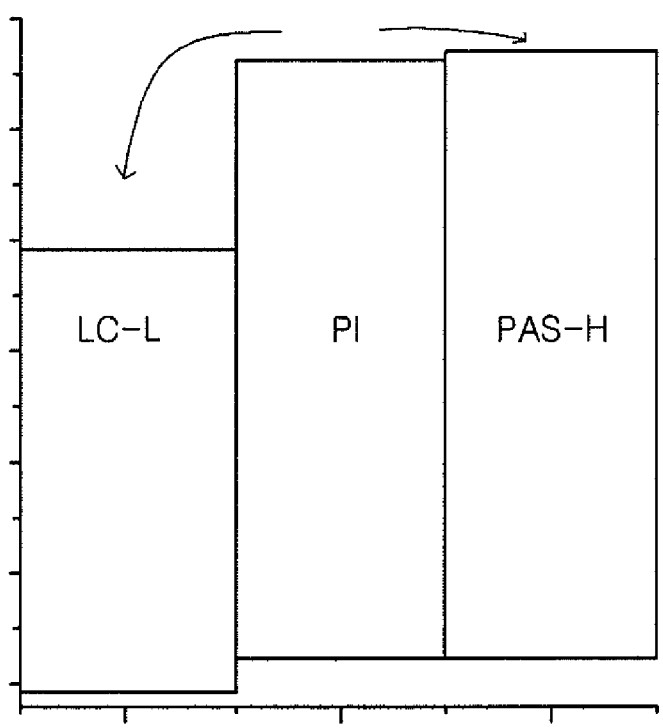
Figure 3C:
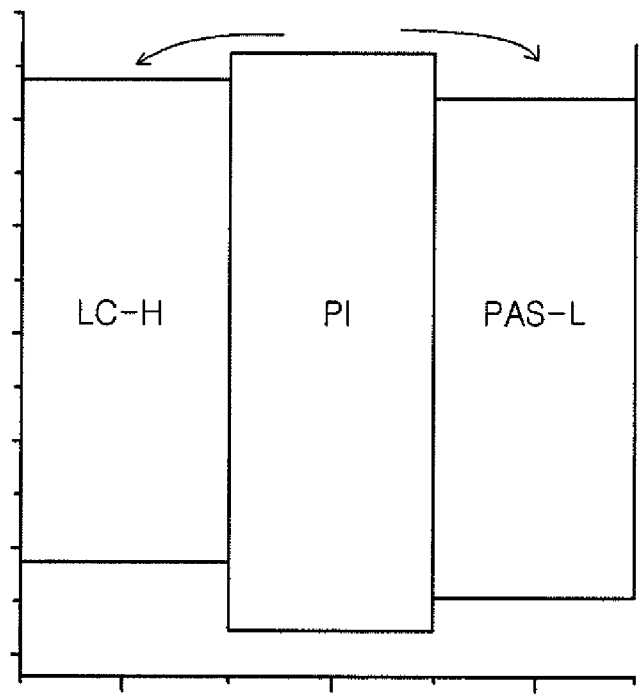
Figure 3D:
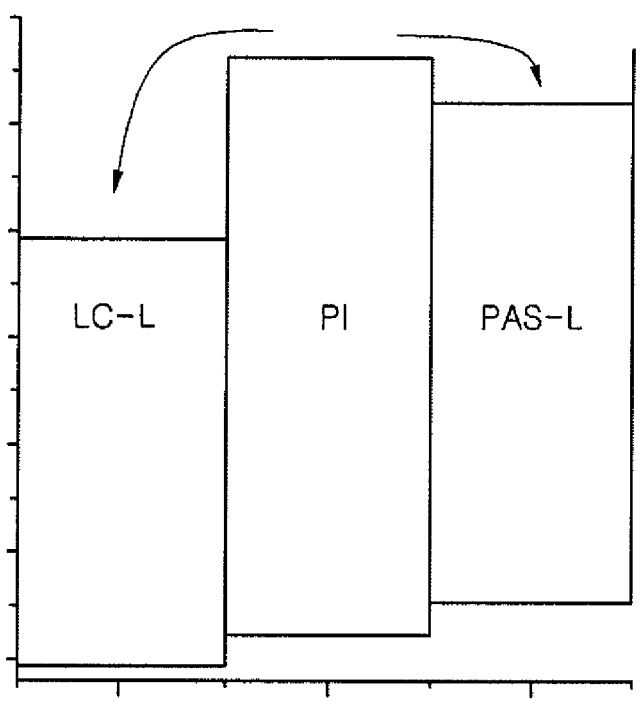

More specifically, FIG. 3A graphically shows the LUMO energy band structure of an LCD device in which the passivation film PAS-H and the liquid crystal layer LC-H according to the related art are formed opposite to each other in the center of the first alignment film PI. FIG. 3B graphically shows the LUMO energy band structure of an LCD device in which the related art passivation film PAS-H and the present embodiment liquid crystal layer LC-L are formed opposite to each other in the center of the first alignment film PI. FIG. 3C graphically shows the LUMO energy band structure of an LCD device in which the present embodiment passivation film PAS-L and the related art liquid crystal layer LC-H are formed opposite to each other in the center of the first alignment film PI. FIG. 3D graphically shows the LUMO energy band structure of an LCD device in which the passivation film PAS-L and the liquid crystal layer LC-L according to the present embodiment are formed opposite to each other in the center of the first alignment film PI.

To compare FIGS. 3A to 3D, it is more evidently revealed that the energy bands of the passivation film PAS-L and the liquid crystal layer LC-L according to the present embodiment become lower than those of the passivation film PAS-H and the liquid crystal layer LC-H, from the energy band of the first alignment film PI.

The LCD devices each including the passivation film, the liquid crystal layer, and the first alignment film which form the energy band structures shown in FIGS. 3A to 3D, have the initial brightness "A" of residual images and the fading-away time (or speed) "τ" of residual images as described in the following Table 2. As indicated in Table 2, it is evident that the LCD device of the present embodiment including the passivation film and the liquid crystal layer which correspond to the energy bands shown in FIG. 3D has fainter initial brightness "A" and shorter fading-away time "τ" of a residual image compared to that of the related art including the passivation film and the liquid crystal layer which correspond to the energy bands shown in FIG. 3A. It was found that the DC voltage is more stable as the initial brightness "A" and the fading-away time "τ" of a residual image become lower. As such, the residual image in the IPS mode LCD device can be minimized.

TABLE 2

|   | FIG. 3A | FIG. 3B | FIG. 3C | FIG. 3D |
|---|---------|---------|---------|---------|
| A | 1.25 | 0.18 | 0.12 | 0.08 |
| τ | 33.99 min | 9.67 min | 5.19 min | 5 min |

As described above, the IPS mode LCD device according to an embodiment of the present disclosure employs the passivation film 120 and the liquid crystal layer 300 having lower non-resistances in comparison with the a first alignment film 250a, thereby lowering the energy bands of the passivation film 120 and the liquid crystal layer 300 at below that of the first alignment film 250a. As such, the passivation film 120 and the liquid crystal layer 300 can be used in the paths of discharging the DC voltage charged in the interfacial surfaces between themselves and the first alignment film 250a. Therefore, the IPS mode LCD device can minimize the residual image.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An in-plane-switching mode liquid crystal display device comprising:
   first and second substrates opposite to each other;
   a liquid crystal layer interposed between the first and second substrates;
   a passivation film formed on the first substrate in which a thin film transistor is disposed;
   pixel and common electrodes arranged alternately with each other; and
   a first alignment film formed on the pixel and common electrodes,
   wherein the liquid crystal layer and the passivation film are formed to have two orders of a specific resistivity lower than a specific resistivity of the first alignment film.

2. The in-plane-switching mode liquid crystal display device as claimed in claim 1, wherein the liquid crystal layer is formed to have the specific resistivity of about $5.5 \times 10^{12}$ Ωcm.

3. The in-plane-switching mode liquid crystal display device as claimed in claim 2, wherein the liquid crystal layer with the specific resistivity of about $5.5 \times 10^{12}$ Ωcm is formed to further include one of a carbon-nitride-based liquid crystal material and a tolane-based liquid crystal material.

4. The in-plane-switching mode liquid crystal display device as claimed in claim 1, wherein the passivation film is formed through a chemical vapor deposition process which controls a $SiH_4/NH_3$ flow rate.

5. The in-plane-switching mode liquid crystal display device as claimed in claim 1, wherein the second substrate includes:
   a black matrix formed on the second substrate;
   color filter patterns formed on the second substrate exposed by the black matrix; and
   a second alignment film formed on the second substrate which is provided with the color filter patterns.

\* \* \* \* \*